US010213987B2

United States Patent
Hayashi et al.

(10) Patent No.: US 10,213,987 B2
(45) Date of Patent: Feb. 26, 2019

(54) RUBBER METAL LAMINATE

(75) Inventors: Hideki Hayashi, Ibaraki (JP); Mitsuru Maeda, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 14/111,903

(22) PCT Filed: Apr. 2, 2012

(86) PCT No.: PCT/JP2012/058903
§ 371 (c)(1),
(2), (4) Date: Oct. 15, 2013

(87) PCT Pub. No.: WO2012/141025
PCT Pub. Date: Oct. 18, 2012

(65) Prior Publication Data
US 2014/0044975 A1 Feb. 13, 2014

(30) Foreign Application Priority Data
Apr. 15, 2011 (JP) .................................. 2011-090586

(51) Int. Cl.
| | | |
|---|---|---|
| B32B 15/06 | (2006.01) | |
| B32B 15/082 | (2006.01) | |
| C08L 27/18 | (2006.01) | |
| B32B 7/12 | (2006.01) | |
| B32B 15/18 | (2006.01) | |
| B32B 15/20 | (2006.01) | |
| B32B 25/14 | (2006.01) | |
| C08L 27/16 | (2006.01) | |

(52) U.S. Cl.
CPC ............... *B32B 15/06* (2013.01); *B32B 7/12* (2013.01); *B32B 15/082* (2013.01); *B32B 15/18* (2013.01); *B32B 15/20* (2013.01); *B32B 25/14* (2013.01); *C08L 27/18* (2013.01); *B32B 2255/06* (2013.01); *B32B 2255/26* (2013.01); *B32B 2605/00* (2013.01); *C08L 27/16* (2013.01); *Y10T 428/31544* (2015.04)

(58) Field of Classification Search
None
See application file for complete search history.

(56) References Cited

U.S. PATENT DOCUMENTS

| 3,723,577 A | 3/1973 | Stivers | |
|---|---|---|---|
| 4,612,351 A * | 9/1986 | Caporiccio | C08F 214/22 525/199 |
| 5,045,143 A | 9/1991 | Arcella et al. | |
| 5,459,202 A * | 10/1995 | Martinez | C08L 27/10 524/520 |
| 2005/0155690 A1* | 7/2005 | Park | 156/60 |
| 2008/0171844 A1* | 7/2008 | Samuels et al. | 526/255 |
| 2009/0011164 A1* | 1/2009 | Masuda | C08L 27/18 428/36.92 |
| 2009/0227726 A1* | 9/2009 | Stevens | C08L 27/16 524/520 |

FOREIGN PATENT DOCUMENTS

| JP | 51-8416 | 3/1976 |
|---|---|---|
| JP | 55-108410 | 8/1980 |
| JP | 60-36552 | 2/1985 |
| JP | 11-315180 | 11/1999 |
| JP | 2000-272045 | 10/2000 |
| JP | 2007-277340 | 10/2007 |
| JP | 2008-031195 | 2/2008 |
| JP | 2011-032359 | 2/2011 |
| WO | WO 2011-002080 A1 | 1/2011 |

OTHER PUBLICATIONS

International Preliminary Report on Patentability and Written Opinion from corresponding PCT application No. PCT/JP2012/058903 dated Oct. 24, 2013 (7 pgs).
International Search Report based on corresponding PCT application No. PCT/JP2012/058903 dated Jun. 19, 2012 (4 pg).

\* cited by examiner

*Primary Examiner* — Callie E Shosho
*Assistant Examiner* — Patrick N English
(74) *Attorney, Agent, or Firm* — Brinks Gilson & Lione

(57) ABSTRACT

Disclosed is a rubber metal laminate comprising metal, an adhesive layer and a perfluoroelastomer layer, the perfluoroelastomer layer being formed from a vulcanizate layer of a blend comprising 2 to 10 parts by weight of a vinylidene fluoride-chlorotrifluoroethylene copolymer, based on 100 parts by weight of a perfluoroelastomer. The rubber metal laminate of the present invention can effectively improve the interlayer adhesion of the perfluoroelastomer to the metal and pockmarked surface (the state that crater-like irregularity is formed) of the perfluoroelastomer layer laminated on the metal.

3 Claims, No Drawings

RUBBER METAL LAMINATE

RELATED APPLICATION

This application is a 35 U.S.C. § 371 national phase filing of International Patent Application No. PCT/JP2012/058903, filed Apr. 2, 2012, through which and to which priority is claimed under 35 U.S.C. § 119 to Japanese Patent Application No. 2011-090586, filed Apr. 15, 2011.

TECHNICAL FIELD

The present invention relates to a rubber metal laminate. More particularly, the present invention relates to a rubber metal laminate comprising metal, an adhesive layer and a perfluoroelastomer layer.

BACKGROUND ART

Conventionally, fluororubber is used as a molding material for various seal parts used in high-temperature environments; however, along with a trend of higher-performance auto engines, there is an increasing demand for seal parts that can be used in much higher-temperature environments. Moreover, fluororubber has excellent heat resistance and oil resistance, but has inferior resistance to organic solvents such as ethers and ketones; thus, applications of fluororubber to parts for sealing such organic solvents are discouraged. Furthermore, due to its inferior chemical resistance, fluororubber cannot be used in cleaning rolls, rolls for copy machines and printers, and the like, to be in contact with alkali, acid, organic solvents, etc.

In order to compensate such defects of fluororubber, perfluoroelastomers are increasingly used in place of fluororubber. Perfluoroelastomers are often used in O rings; and the like that form seal parts by the themselves. In fact, however, they are rarely used in oil seals, rolls, valves; and the like combined with metal, because bonding methods thereof are not established. In addition, there are no commercially available vulcanizing adhesives suitable for perfluoroelastomers.

In response to this situation, the present applicant has previously proposed a perfluoroelastomer-laminated metal having improved interlayer adhesion, the perfluoroelastomer-laminated metal being produced by laminating an organic peroxide-vulcanized perfluoroelastomer layer via a vulcanizing adhesive layer comprising a silane coupling agent as a main component and an organic peroxide-vulcanized fluororubber layer sequentially formed on metal (see Patent Document 1). However, the laminated metal has two adhesive layers, i.e., the vulcanizing adhesive layer and the vulcanized fluororubber layer, increasing the number of production processes. This causes cost increase in industrial terms, so that a single adhesive layer is desired.

PRIOR ART DOCUMENT

Patent Document

Patent Document 1: JP-A-2000-272045
Patent Document 2: JP-A-2007-277340
Patent Document 3: JP-A-2008-31195
Patent Document 4: JP-A-55-108410

SUMMARY OF INVENTION

Problem to be Solved by the Invention

As a vulcanizing adhesive composition that is suitably used for bonding a perfluoroelastomer and that improves the interlayer adhesion in a perfluoroelastomer-laminated metal having a single adhesive layer, the present applicant has further proposed a vulcanizing adhesive composition comprising 50 to 400 parts by weight of a silane coupling agent and 50 to 400 parts by weight of an organic metallic compound, based on 100 parts by weight of phenolic resin (see Patent Document 2).

In the perfluoroelastomer-laminated metal using such an adhesive composition, which is effectively used to bond metal and a perfluoroelastomer, the lamination of the perfluoroelastomer and the metal can be achieved via a single adhesive layer without forming a plurality of adhesive layers as in a conventional method. This leads to an excellent effect that composite seal parts having excellent heat resistance and chemical resistance, particularly excellent acid resistance, can be obtained. However, there is a demand for improvements in the interlayer adhesion to the metal and in the pockmarked surface of the rubber layer laminated on the metal.

An object of the present invention is to provide a rubber metal laminate comprising metal, an adhesive layer and a perfluoroelastomer layer, wherein the interlayer adhesion of the perfluoroelastomer layer to the metal and the pockmarked surface of the perfluoroelastomer layer laminated on the metal are improved.

Means for Solving the Problem

The above object of the present invention can be achieved by a rubber metal laminate comprising metal, an adhesive layer and a perfluoroelastomer layer, the perfluoroelastomer layer being formed from a vulcanizate layer of a blend comprising 2 to 10 parts by weight of a vinylidene fluoride-chlorotrifluoroethylene copolymer, based on 100 parts by weight of a perfluoroelastomer.

Effect of Invention

The rubber metal laminate of the present invention, which is formed from a vulcanizate layer of a blend comprising 2 to 10 parts by weight of a vinylidene fluoride-chlorotrifluoroethylene copolymer, based on 100 parts by weight of a perfluoroelastomer, can effectively improve the interlayer adhesion of the perfluoroelastomer layer to the metal and pockmarked surface (the state that crater-like irregularity is formed) of the perfluoroelastomer layer laminated on the metal.

Since the metal and perfluoroelastomer layer of the rubber metal laminate of the present invention are effectively bonded to each other, the perfluoroelastomer-laminated metal can be effectively used as a perfluoroelastomer-laminated metal part such as a valve, a roll of a copy machine or printer, an oil seal, and the like.

EMBODIMENTS FOR CARRYING OUT THE INVENTION

Examples of the metal on which a perfluoroelastomer is laminated include mild steel, stainless steel, aluminum, aluminum die cast, and the like. The form of the metal varies depending on the type of product; for example, metal in the form of a plate is used for a sealing material and metal in the form of a rod is used for a roll.

The metal is coated with an adhesive, e.g., a vulcanizing adhesive comprising a silane coupling agent as a main component, and dried (generally air-dried) at room temperature, preferably followed by baking at about 120 to 200° C.

for about 5 to 10 minutes. Usable silane coupling agents are commercially available vulcanizing adhesives comprising at least one of aminosilane and vinylsilane as a main component, such as Chemlok AP-133, Y4310, and 607 produced by Lord Corporation, which can be used as they are.

An unvulcanized perfluoroelastomer is bonded as a composition to the vulcanizing adhesive. Usable perfluoroelastomers are, for example, copolymers of perfluorovinyl ether and at least one of tetrafluoroethylene and hexafluoropropene. The copolymerization ratio of perfluorovinyl ether in the obtained copolymer is about 10 to 50 mol %, preferably about 15 to 40 mol %.

Examples of perfluorovinyl ether, which is a comonomer, include those represented by the general formula:

$$CF_2=CFO(CF_2CFXO)_nRf \quad [XI]$$

Rf: a $C_1$-$C_5$ lower perfluoroalkyl group
X: F or $CF_3$
n: an integer of 0 or 1 to 4

Examples of perfluorovinyl ether represented by the general formula [XI] are as follows:
$CF_2=CFOCF_3$
$CF_2=CFOC_2F_5$
$CF_2=CFOC_3F_7$
$CF_2=CFO[CF_2CF(CF_3)O]_{1-4}CF_3$
$CF_2=CFO[CF_2CF(CF_3)O]_{1-4}C_3F_7$ Moreover, examples of perfluorovinyl ether other than the perfluorovinyl ether represented by the general formula [XI] include those represented by the general formula:

$$CF_2=CFO(Rf^1O)_m(Rf^2O)_nRf \quad [XII]$$

Rf: a $C_1$-$C_6$ perfluoroalkyl group
$Rf^1$, $R^2$: a $C_2$-$C_6$ linear or branched perfluoroalkylene group; $Rf^1$ and $Rf^2$ have different numbers of carbon atoms.
m, n: 1 to 10

For example, the following compounds can be used:
$CF_2=CFO(CF_2CF_2O)_m(CF_2O)_nCF_3$
In addition, for example, $CF_2=CFO(CF_2)_nOCF_3$, which is not represented by the above general formula [XI] or [XII], can also be used.

Into the perfluoroelastomer, a peroxide-crosslinkable group that is at least one of a bromine-containing group, an iodine-containing group and a bromine/iodine-containing group; or an amine-vulcanizable group comprising a cyano group, an unsaturated group derived from a fluorine-containing diene compound, or the like, is introduced. Examples of such a peroxide-crosslinkable group or amine-vulcanizable group include saturated or unsaturated bromine-containing compounds, iodine-containing compounds, bromine- and iodine-containing compounds, or cyano group-containing compounds, which are listed below. The coexistence of a saturated bromine- and/or iodine-containing compound during the polymerization reaction allows the introduction of a bromine group and/or an iodine group into the end of the obtained copolymer. The coexistence of an unsaturated bromine- and/or iodine-containing compound or a cyano group-containing compound during the polymerization reaction allows the introduction of a bromine group and/or an iodine group, or a cyano group into the obtained copolymer.

$CF_2=CFBr$
$CF_2=CFI$
$CF_2=CHBr$
$CF_2=CHI$
$CH_2=CHCF_2CF_2Br$
$CH_2=CHCF_2CF_2I$
$CF_2=CFOCF_2CF_2Br$
$CF_2=CFOCF_2CF_2I$
$CH_2=CHBr$
$CH_2=CHI$
$Br(CF_2)_4Br$
$I(CF_2)_4I$
$Br(CH_2)_2(CF_2)_4(CH_2)_2Br$
$I(CH_2)_2(CF_2)_4(CH_2)_2I$
$ICF_2CF_2Br$
$CF_2=CFO(CF_2)_nOCF(CF_3)CN$
$CF_2=CFO(CF_2)_nCN$
$CF_2=CFO[CF_2CF(CF_3)O]_m(CF_2)_nCN$

The perfluoroelastomer is blended with a vinylidene fluoride-chlorotrifluoroethylene copolymer in an amount of 2 to 10 parts by weight, preferably 3 to 8 parts by weight, based on 100 parts by weight of the perfluoroelastomer, and a vulcanizate layer is formed. When the blend ratio of vinylidene fluoride-chlorotrifluoroethylene copolymer is less than this range, the desired effects, i.e., effective improvement in the interlayer adhesion of the perfluoroelastomer to the metal and pockmarked surface of the perfluoroelastomer layer are not achieved. In contrast, when the blend ratio is greater than this range, peel strength and the pockmarked surface are improved; however, the fluorine content is reduced, so that amine resistance to ethylenediamine or the like, which is used as a cleaning solution, is significantly lowered.

In terms of adhesion, a usable vinylidene fluoride-chlorotrifluoroethylene copolymer produced by copolymerization of 10 to 50 mol %, preferably 15 to 45 mol %, of chlorotrifluoroethylene is used. Further, a molecular weight modifier such as isopropanol or an aforementioned saturated bromine-containing compound, iodine-containing compound, bromine- and iodine-containing compound, or the like (e.g., 1-bromo-2-iodoethane or the like) can also be used in the copolymerization reaction.

The perfluoroelastomer blended with a vinylidene fluoride-chlorotrifluoroethylene copolymer and having a peroxide-crosslinkable group is crosslinked with an organic peroxide. Examples of the organic peroxide used as a crosslinking agent include t-butyl hydroperoxide, 1,1,3,3-tetramethylbutyl hydroperoxide, p-methane hydroperoxide, cumene hydroperoxide, diisopropylbenzene hydroperoxide, 2,5-dimethylhexane-2,5-dihydroperoxide, di-t-butyl peroxide, dicumyl peroxide, t-butylcumyl peroxide, 1,1-di(t-butylperoxy)cyclododecane, 2,2-di(t-butylperoxy)octane, 1,1-di(t-butylperoxy)cyclohexane, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 2,5-dimethyl-2,5-di(benzoylperoxy)hexane, 1,1-di(t-butylperoxy)-3,3,5-trimethylcyclohexane, n-butyl-4,4-di(t-butylperoxy)valerate, benzoyl peroxide, m-toluyl peroxide, p-chlorobenzoyl peroxide, 2,4-dichlorobenzoyl peroxide, t-butylperoxy isobutyrate, t-butylperoxy-2-ethylhexanoate, t-butylperoxy benzoate, t-butylperoxyisopropyl carbonate, t-butylperoxyallyl carbonate, and the like. The proportion of such an organic peroxide is about 0.1 to 10 parts by weight, preferably about 0.5 to 3 parts by weight, based on 100 parts by weight of the perfluoroelastomer.

When peroxide crosslinking is carried out, a polyfunctional unsaturated compound co-crosslinking agent such as diallyl phthalate, triallyl cyanurate, triallyl isocyanurate, trimethacryl isocyanurate, triallyl trimellitate, trimethylolpropane trimethacrylate, ethylene glycol dimethacrylate; or the like is preferably used. The proportion of such a co-crosslinking agent is about 1 to 10 parts by weight, preferably about 2 to 5 parts by weight, based on 100 parts by weight of the perfluoroelastomer.

Moreover, the perfluoroelastomer may be copolymerized with a fluorine-containing diene compound in a copolymerization ratio of 0.001 to 1 mol %, preferably 0.1 to 0.5 mol %, in the copolymer. Thereby, an amine-vulcanizable group comprising an unsaturated group derived from the diene compound can be formed in the perfluoroelastomer (see Patent Document 3).

The fluorine-containing diene compound may be at least one fluorine-containing diene having 4 to 8 carbon atoms, as described in Patent Document 4, such as those having $CF_2=CF-$, $CF_2=CH-$, or $CF_2=CFO-$ as one of their terminal unsaturated groups. Specific examples thereof include $CF_2=CFCF=CF_2$, $CF_2=CF(CF_2)_4CF=CF_2$, $CF_2=CFCH=CF_2$, $CF_2=CHCH=CF_2$, $CF_2=CF(CF_2)_2CF=CF_2$, $CF_2=CFO(CF_2)_2OCF=CF_2$, $CF_2=CFO(CF_2)_2OCF_2CF(CF_3)OCF=CF_2$, $CF_2=CFO(CF_2)_2OCF(CF_3)CF_2OCF=CF_2$, and the like.

The perfluoroelastomer copolymerized with a fluorine-containing diene compound to introduce an amine-vulcanizable group is vulcanized with an amine compound. The amine compound used as a vulcanizing agent is any one of the amine compounds represented by the following general formulas [A] to [D]. The proportion of such an amine compound is 0.1 to 10 parts by weight, preferably 0.5 to 5 parts by weight, based on 100 parts by weight of the perfluoroelastomer.

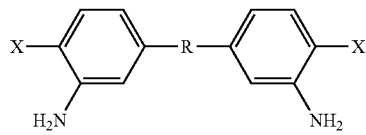
[A]

R: an alkylidene or alkylene group having 1 to 6 carbon atoms, a perfluoroalkylidene or perfluoroalkylene group having 1 to 10 carbon atoms, $SO_2$, O, CO, or a carbon-carbon bond directly linking two benzene rings X: a hydroxyl group or an amino group

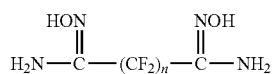
[B]

n: an integer of 1 to 10

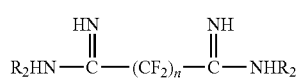
[C]

$R_2$: H or $NH_2$
n: an integer of 1 to 10
Preferably,

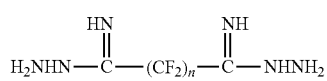
[D]

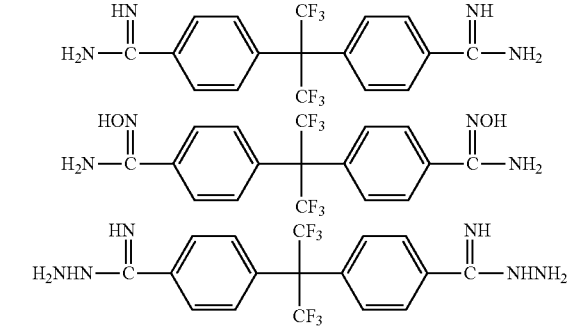

$R_3$: H or OH
$R_4$: H or $NH_2$
Preferably,

The rubber metal laminate is produced in the following manner. A vulcanizing adhesive layer is formed on the surface of metal, for which a metal plate is generally used. Then, an unvulcanized perfluoroelastomer composition prepared by mixing a blend of a perfluoroelastomer and a vinylidene fluoride-chlorotrifluoroethylene copolymer, with an aforementioned organic peroxide crosslinking agent and polyfunctional unsaturated compound co-crosslinking agent or an amine compound vulcanizing agent, as well as various compounding agents generally used in the rubber industry, such as a reinforcing agent or filler (e.g., carbon black, silica, or the like) and an acid acceptor (e.g., an oxide or hydroxide of divalent metal, or hydrotalcite or the like), is bonded to the vulcanizing adhesive layer by any bonding method, followed by vulcanization under pressure at about 170 to 200° C., preferably about 180 to 200° C., for about 2 to 30 minutes, thereby forming a perfluoroelastomer layer on the metal. The perfluoroelastomer layer is generally formed to a thickness of about 1 to 1.5 mm, although it varies depending on the application.

EXAMPLES

The following describes the present invention with reference to Examples.

Reference Example 1

A 10-L stainless steel autoclave was deaerated by replacing with nitrogen gas and then the following components were charged:

| | |
|---|---|
| Surfactant $CF_3(CF_2)_2OCF(CF_3)CF_2OCF(CF_3)COONH_4$ | 50.0 g |
| $Na_2HPO_4·12H_2O$ | 5.0 g |
| Ion-exchange water | 4,000 ml |

The autoclave was again deaerated by replacing with nitrogen gas and then the following components were charged:

| Tetrafluoroethylene [TFE] | 130 g |
| --- | --- |
| | (59.1 mol %) |
| Perfluoro(methyl vinyl ether) [FMVE] | 150 g |
| | (40.9 mol %) |
| 1-bromo-2-iodoethane [IBrTFE] | 8.0 g |

Subsequently, the temperature in the autoclave was adjusted to 80° C., 7.0 g of ammonium persulfate was added as a 0.3 wt. % aqueous solution and the polymerization reaction was initiated. While maintaining the pressure at 7 to 8 relative bar (7 to 8×10$^5$ Pa), a gas mixture of 820 g (61.1 mol %) of TFE and 870 g (38.9 mol %) of FMVE was added. While maintaining the temperature at 80° C., the reaction was continued until the internal pressure of the autoclave was reduced to 5 relative bar (5×10$^5$ Pa).

After completion of the reaction, the autoclave was cooled and the residual gas was discharged, thereby obtaining 6,110 g of emulsion. The emulsion was added to a 10 wt. % potassium alum aqueous solution in an equal volume ratio and the coagulated product was washed with water and dried, thereby obtaining 2,039 g of a fluorine-containing elastomer A (polymer composition ratio measured by $^{19}$F-NMR: TFE/FMVE molar ratio=34.0/66.0).

Reference Example 2

A 10-L stainless steel autoclave was deaerated by replacing with nitrogen gas and then the following components were charged:

| Surfactant CF$_3$(CF$_2$)$_2$OCF(CF$_3$)CF$_2$OCF(CF$_3$)COONH$_4$ | 10.0 g |
| --- | --- |
| Na$_2$HPO$_4$•12H$_2$O | 10.0 g |
| Ion-exchange water | 4,400 ml |

The autoclave was again deaerated by replacing with nitrogen gas and then the following components were charged:

| Vinylidene fluoride [VdF] | 480 g |
| --- | --- |
| | (86.2 mol %) |
| Chlorotrifluoroethylene [CTFE] | 140 g |
| | (13.8 mol %) |
| Isopropanol [IPA] | 6.0 g |

Subsequently, the temperature in the autoclave was adjusted to 80° C., 4.0 g of ammonium persulfate was added as a 0.3 wt. % aqueous solution and the polymerization reaction was initiated. While maintaining the pressure at 22 to 23 relative bar (22 to 23×10$^5$ Pa), a gas mixture of 780 g (56.3 mol %) of VdF and 1,100 g (43.7 mol %) of CTFE was added. While maintaining the temperature at 80° C., the reaction was continued until the internal pressure of the autoclave was reduced to 7 relative bar (7×10$^5$ Pa).

After completion of the reaction, the autoclave was cooled and the residual gas was discharged, thereby obtaining 6,530 g of emulsion. The emulsion was added to a 2 wt. % CaCl$_2$ aqueous solution in an equal volume ratio and the coagulated product was washed with water and dried, thereby obtaining 2,189 g of a fluorine-containing elastomer I (polymer composition ratio measured by $^{19}$F-NMR: VdF/CTFE molar ratio=58.0/42.0).

Reference Example 3

In Reference Example 2, the gas mixture was changed to a gas mixture of 1,320 g (81.1 mol %) of VdF and 560 g (18.9 mol %) of CTFE and the reaction was continued until the internal pressure of the autoclave was reduced to 5 relative bar (5×10$^5$ Pa), thereby obtaining 2,162 g (6,530 g as emulsion) of a fluorine-containing elastomer II (VdF/CTFE molar ratio=83.8/16.2).

Reference Example 4

In Reference Example 3, 8.0 g of IBrTFE was used in place of IPA, thereby obtaining 2,189 g (6,552 g as emulsion) of a fluorine-containing elastomer III (VdF/CTFE molar ratio=83.4/16.6)

Example 1

| | |
| --- | --- |
| Fluorine-containing elastomer A | 100 parts by weight |
| Fluorine-containing elastomer I | 5 parts by weight |
| MT carbon black (Thermax N990, produced Cancarb Limited) | 30 parts by weight |
| Hydrotalcite (DHT-4A, produced by Kyowa Chemical Industry Co., Ltd.) | 1 part by weight |
| Triallyl isocyanurate (produced by Nippon Kasei Chemical Co., Ltd.) | 3 parts by weight |
| 2,5-dimethyl-2,5-di(t-butylperoxy)hexane (Perhexa 25B-40, produced by NOF Corporation; concentration: 40 wt. %) | 2 parts by weight |

The above components were mixed by a two-roll mill. The resulting curable composition was subjected to compression molding at 180° C. for 10 minutes, thereby forming a sheet (120×150×2 mm) and an O ring (P24). The formed products were further subjected to oven vulcanization (secondary vulcanization) at 230° C. for 24 hours.

These secondary vulcanizates were measured for the following items:

Normal-state physical properties: According to JIS K6250 and K6253 corresponding to ISO 23529 and 7619, respectively.

Compression set: The compression set value of the P24 O ring at 200° C. after 70 hours was measured according to Method B of ASTM B395.

90-degree peel test: A solution prepared by dissolving an adhesive comprising aminosilane and vinylsilane as main components (Chemlok AP-133, produced by Lord Corporation) in a 4-fold amount of methyl ethyl ketone was applied to the surface of a zinc phosphate-treated steel sheet (SPCC) and dried at room temperature for 30 minutes, followed by baking at 150° C. for 30 minutes. An uncrosslinked material compound comprising the above-prepared curable composition was bonded to the resulting adhesive layer-formed metal sheet, followed by crosslinking under pressure at 180° C. for 6 minutes, thereby producing a fluorine-containing elastomer-laminated metal plate. The fluorine-containing elastomer-laminated metal plate was subjected to a 90-degree peel test according to JIS K6256 corresponding to ISO 813 and 814.

Amine resistance: The volume change ratio was measured after immersion in ethylenediamine at room temperature for 70 hours.

Pockmarked surface: Crater-like irregularity formed on the surface of a test piece (the sheet) was deemed as pockmarked and evaluated as follows: no pockmarks on the surface: ○; 5 or less pockmarks: Δ; and 6 or more pockmarks: ×.

Examples 2 to 5 and Comparative Examples 1 to 3

In Example 1, the types and amounts of fluorine-containing elastomers I to III were changed in various ways. The following table shows the measurement results together with the types and amounts of fluorine-containing elastomers I to III.

TABLE

|  | Ex. | | | | | Comp. Ex. | | |
| --- | --- | --- | --- | --- | --- | --- | --- | --- |
|  | 1 | 2 | 3 | 4 | 5 | 1 | 2 | 3 |
| [Fluorine-containing elastomer] | | | | | | | | |
| Type | I | II | III | I | I | — | I | I |
| Amount (part by weight) | 5 | 5 | 5 | 3 | 10 | 0 | 1 | 15 |
| [Measurement result] Normal-state physical properties | | | | | | | | |
| Hardness (Duro-A) | 79 | 81 | 80 | 80 | 78 | 80 | 80 | 77 |
| Breaking strength (MPa) | 13.8 | 13.2 | 14.3 | 13.6 | 13.2 | 13.5 | 13.7 | 13.1 |
| Elongation at break (%) | 300 | 260 | 280 | 310 | 320 | 310 | 300 | 340 |
| Compression set | | | | | | | | |
| 200° C., 70 hrs (%) | 43 | 46 | 41 | 43 | 45 | 43 | 44 | 47 |
| 90-degree peel test | | | | | | | | |
| Peel strength (N/mm) | 3.4 | 2.2 | 3.8 | 2.6 | 4.1 | 0.3 | 0.9 | 5.4 |
| Amine resistance | | | | | | | | |
| Volume change ratio (%) | 2 | 5 | 3 | 3 | 8 | 2 | 2 | 31 |
| Pockmarked surface | | | | | | | | |
| Evaluation | ○ | ○ | ○ | ○ | ○ | X | Δ | ○ |

The above results indicate the following:

(1) In each Example, in which a fixed amount of VdF-CTFE copolymer was blended into a perfluoroelastomer, the pockmarked surface was improved, without impairing the adhesion of the perfluoroelastomer to the metal and amine resistance.

(2) In Comparative Example 1, in which a VdF-CTFE copolymer was not used, the adhesion of the perfluoroelastomer to the metal was markedly reduced, and the evaluation of the pockmarked surface was also low.

(3) In Comparative Example 2, in which a VdF-CTFE copolymer was used in an amount less than the specified amount, only small effects were observed on the improvement in the adhesion of the perfluoroelastomer to the metal, and on the pockmarked surface.

(4) In Comparative Example 3, in which a VdF-CTFE copolymer was used in an amount greater than the specified amount, the adhesion of the perfluoroelastomer to the metal was enhanced, while amine resistance was significantly lowered.

The invention claimed is:

1. A rubber metal laminate comprising metal, an adhesive layer formed on the metal and a perfluoroelastomer layer formed on the adhesive layer, the perfluoroelastomer layer being formed from a vulcanizate layer of a blend comprising 2 to 5 parts by weight of a vinylidene fluoride-chlorotrifluoroethylene copolymer elastomer, based on 100 parts by weight of a perfluoroelastomer wherein the perfluoroelastomer is a copolymer of perfluorovinyl ether and at least one of tetrafluoroethylene and hexafluoropropene, the vulcanizate layer further comprises a filler.

2. The rubber metal laminate according to claim 1, wherein in the vinylidene fluoride-chlorotrifluoroethylene copolymer elastomer, 10 to 50 mol % of chlorotrifluoroethylene is copolymerized.

3. The rubber metal laminate according to claim 1, wherein the perfluoroelastomer layer is a peroxide-crosslinked product layer of the blend.

* * * * *